(12) United States Patent
Okamoto et al.

(10) Patent No.: US 8,508,097 B2
(45) Date of Patent: Aug. 13, 2013

(54) STATOR OF ELECTRIC ROTATING MACHINE

(75) Inventors: Shogo Okamoto, Chiyoda-ku (JP);
Shuichi Tamura, Chiyoda-ku (JP);
Masatoshi Tashima, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 225 days.

(21) Appl. No.: 12/161,850

(22) PCT Filed: May 25, 2006

(86) PCT No.: PCT/JP2006/310472
§ 371 (c)(1),
(2), (4) Date: Jul. 23, 2008

(87) PCT Pub. No.: WO2007/138647
PCT Pub. Date: Dec. 6, 2007

(65) Prior Publication Data
US 2009/0021101 A1    Jan. 22, 2009

(51) Int. Cl.
*H02K 15/02* (2006.01)
*H02K 1/12* (2006.01)
*H02K 1/18* (2006.01)

(52) U.S. Cl.
USPC ............... 310/254.1; 310/216.004; 310/273; 29/596; 40/629

(58) Field of Classification Search
USPC .... 310/45, 216.041, 254.1, 273; 219/121.65; 40/625, 913, 628, 629; 283/70
See application file for complete search history.

(56) References Cited

U.S. PATENT DOCUMENTS

| 3,436,812 A | * | 4/1969 | Aoki et al. ...................... 29/596 |
| 4,613,842 A | * | 9/1986 | Ichiyama et al. ............. 336/218 |
| 4,822,987 A | * | 4/1989 | Goldenfield et al. ......... 235/487 |
| 4,936,608 A | * | 6/1990 | Gensel et al. ................... 283/70 |
| 6,246,142 B1 | * | 6/2001 | Asao et al. ............. 310/216.136 |
| 6,451,421 B1 | * | 9/2002 | Robertson et al. ......... 428/315.5 |
| 6,777,850 B2 | * | 8/2004 | Harada et al. ............... 310/254.1 |
| 7,005,603 B2 | * | 2/2006 | Addington et al. ...... 219/121.69 |
| 7,471,198 B2 | * | 12/2008 | Yamamoto et al. ......... 340/572.1 |
| 2005/0167800 A1 | * | 8/2005 | Naya ............................. 257/678 |

FOREIGN PATENT DOCUMENTS

| EP | 681 252 | * 11/1995 |
| JP | 53-103101 | * 9/1978 |
| JP | H0438148 | * 2/1992 |
| JP | 06-253479 A | 9/1994 |

(Continued)

OTHER PUBLICATIONS

Hara et al. JP 07-245893 Sep. 19, 1995 JPO Patent Abtracts Machine Translation.*

(Continued)

*Primary Examiner* — Burton Mullins
(74) *Attorney, Agent, or Firm* — Sughrue Mion, PLLC (57) ABSTRACT

A marking (7) that indicates inherent information about a stator (2), is formed of recesses inscribed at a predetermined position on the outer circumferential surface of a laminated iron core (21) of the stator (2), by melting a magnetic thin plate with a laser beam. The marking (7) is formed of recesses in the outer circumferential surface of the laminated iron core (21), i.e., in the outer circumferential surface, at the laminated side of the magnetic thin plate, of the laminated iron core (21). Accordingly, friction or the like does not peel off the marking.

9 Claims, 7 Drawing Sheets

(56) References Cited

FOREIGN PATENT DOCUMENTS

| | | |
|---|---|---|
| JP | 07-245893 A | 9/1995 |
| JP | 09-107650 A | 4/1997 |
| JP | 2002-238191 A | 8/2002 |
| JP | 2002-291184 A | 10/2002 |
| JP | 2002-346633 * | 12/2002 |
| JP | 2005-226808 A | 8/2005 |
| WO | 89-07302 * | 8/1989 |

OTHER PUBLICATIONS

Yamada et al. JP 2002-346633 Dec. 3, 2002 JPO Patent Abstracts Machine Translation.*

English translation of Hara et al. (JP 1995-245893) Sep. 19, 1995.*

* cited by examiner

STATOR OF ELECTRIC ROTATING MACHINE

TECHNICAL FIELD

The present invention relates to a stator of an electric rotating machine such as an in-vehicle AC generator, and more particularly to a stator, of an electric rotating machine, in which inherent information about at least the stator is indicated on a laminated iron core.

BACKGROUND ART

For example, in the case of an electromagnetic valve such as an electromagnetic fuel injection valve, inherent information about the model name, production lot number, serial number, or the like of the product and information including contents that are changeable even in the case of the same model are indicated on a flat portion that is provided at one axis-direction end portion of a cylindrical case and extends in a direction perpendicular to the axis, by use of a marking formed through laser irradiation or the like, and rust-proof plating processing is applied to the marking (e.g., refer to Patent Document 1). The recognition of the contents of the indication through the marking is implemented by peeling off the rust-proof plating and viewing the marking; because the flat portion, of the case, where the marking is provided is exposed outward, the work of recognizing the indication is facilitated.

In the case where, for the same purpose as that of the formation of a marking on the case of the electromagnetic valve, a marking is formed on the stator of an electric rotating machine, e.g., an in-vehicle AC generator, a flat surface that is an axis-direction end portion of the laminated iron core of the stator and extends in a direction perpendicular to the axis corresponds to the flat surface of one end portion of the cylindrical case of the foregoing electromagnetic valve; therefore, by utilizing, as a place where a marking is formed, the flat surface of the axis-direction end portion of the laminated iron core, a marking is readily formed, as the application of the technology for forming a marking on a flat portion of the case of an electromagnetic valve.

[Patent Document 1] Japanese Patent Laid-Open Pub. No. 2005-226808

DISCLOSURE OF THE INVENTION

However, in the case of an electric rotating machine such as an in-vehicle AC generator, the laminated iron core of the stator is configured in such a way that the axis-direction end portion thereof is engaged with and supported by the inner circumferential surface of one end portion of an end frame; thus, when the stator is once integrated in the electric rotating machine, the flat surface of the axis-direction end portion of the laminated iron core is covered with the end frame or the like, whereby a marking formed on the flat portion of the axis-direction end portion of the laminated iron core cannot be recognized from the outside of the electric rotating machine. Accordingly, it is required to disassemble the electric rotating machine in order to recognize the marking. Moreover, the accuracy in the engagement between the laminated iron core of the stator and the end frame is required to be high; therefore, it has been a problem that, in the case where a marking is provided on the flat surface of the axis-direction end portion of the laminated magnetic core, it is required to apply quality-maintaining machining, such as burr-removal processing, to the marking portion, whereby the manufacturing man-hour increases.

The present invention has been implemented in order to solve the foregoing problem; the objective of the present invention is to offer a stator, of an electric rotating machine, including a marking that is provided on a portion, of the stator, where the marking can be recognized without disassembling the electric rotating machine and that indicates inherent information.

A stator of an electric rotating machine, according to the present invention, is characterized by including a laminated iron core having slots, in the inner circumferential surface thereof, in which a stator winding is mounted, the laminated iron core being fixed to a supporting member in such a way that at least part of the outer circumferential surface thereof is exposed; and a marking formed of recesses in the exposed outer circumferential surface of the laminated iron core, and further characterized in that the marking indicates inherent information about at least the stator.

In a stator of an electric rotating machine, according to the present invention, a marking formed of recesses in the exposed outer circumferential surface of the laminated iron core is provided so that inherent information about at least the stator is indicated by the marking. Accordingly, even after the stator has been integrated in an AC generator, inherent information about the electric rotating machine or the stator can readily be referred to through the marking, without disassembling the electric rotating machine.

BEST MODE FOR CARRYING OUT THE INVENTION

Embodiment 1

Figure 1:
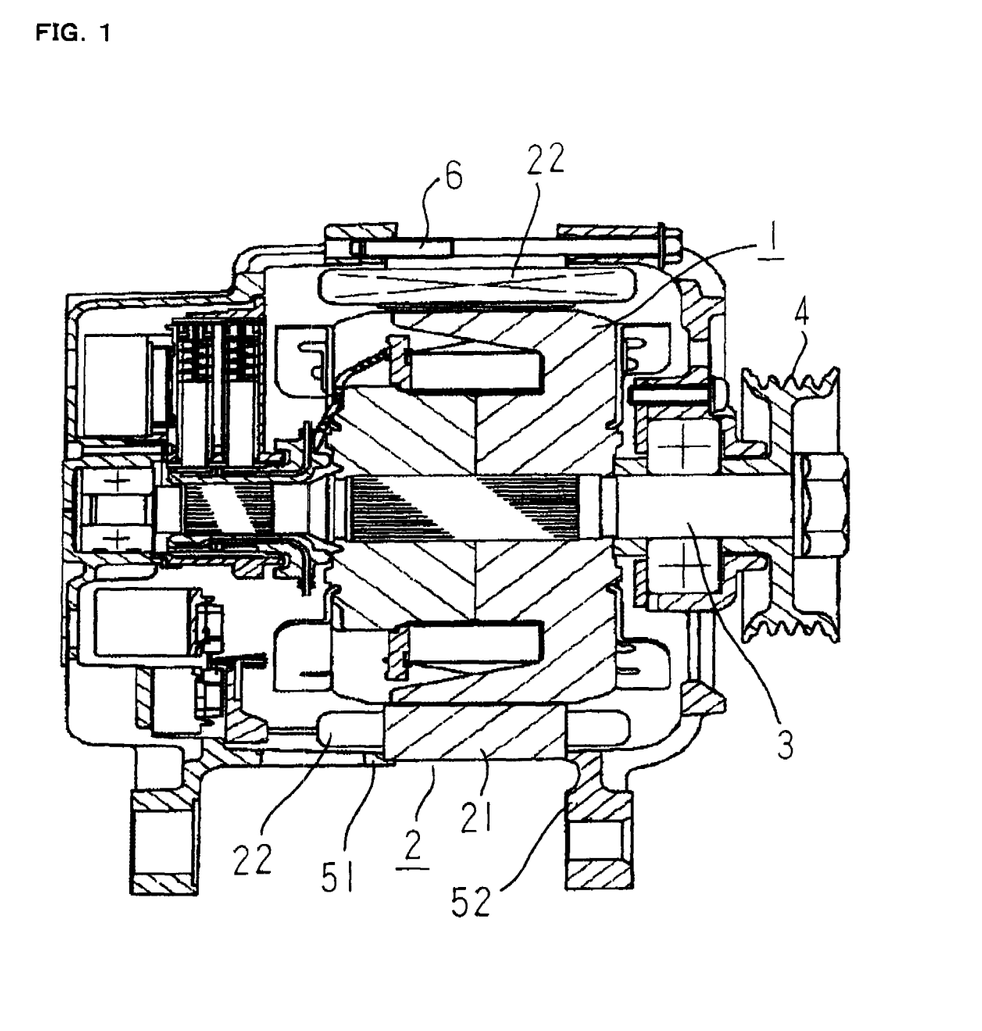
FIG. 1 is a cross-sectional view of an electric rotating machine having a stator according to Embodiment 1 of the present invention.

FIG. 1 is a cross-sectional view of an electric rotating machine provided with a stator according to Embodiment 1 of the present invention. The electric rotating machine illustrated in FIG. 1 is an in-vehicle AC generator mounted in a vehicle; the electric rotating machine is provided with a rotor 1 and a stator 2, and the outer circumferential surface of the rotor 1 and the inner circumferential surface of the stator 2 are disposed in such a way as to face each other, spaced apart from each other by a predetermined distance. The rotor 1 is fixed to a rotor shaft 3 and driven by an internal combustion engine (unillustrated) by the intermediary of a belt (unillustrated) mounted on a pulley 4 provided on the rotor shaft 3.

The stator 2 has a laminated iron core 21 formed in a ring-shaped manner. The laminated iron core 21 is configured with a great number of magnetic thin plates laminated in the axis direction of the rotor shaft 3; inside the laminated iron core 21, a plurality of slots extending radially toward the rotor shaft 3 is provided. A stator winding 22 is contained in the slots of the laminated iron core 21 and, as is well known, generates an induction voltage through the rotation of the rotor 1. Both axis-direction end portions 211 and 212 of the laminated iron core 21 abut on respective end portions of a pair of end frames 51 and 52.

The end frames 51 and 52 in a pair are tightened by a bolt 6 in such a way as to approach each other, so that the laminated iron core 21 is fixed and flanked with the end frames 51 and 52. The end frames 51 and 52 in a pair configure a supporting body for supporting the laminated iron core 21. The portion, of the outer circumferential surface of the laminated iron core 21, where the end frames 51 and 52 in a pair do not exist is exposed; therefore, even after the laminated iron core 21 is integrated in an electric rotating machine, the outer circumferential surface thereof can visually be recognized.

Figure 2:
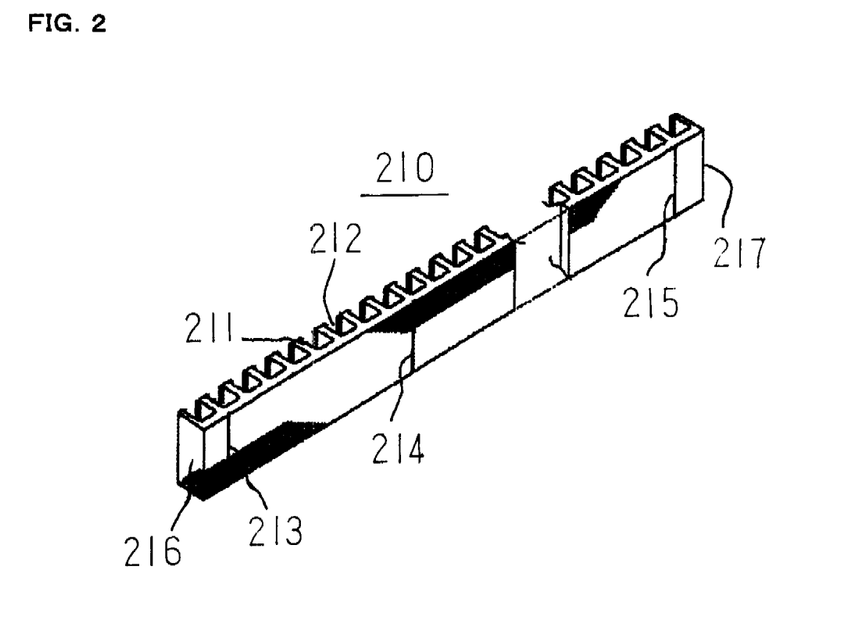
FIG. 2 is a perspective view of laminated iron core pieces that configure a laminated iron core of a stator according to Embodiment 1 of the present invention.

FIG. 2 illustrates a laminated iron core piece 210 to be included in the laminated iron core 21. In FIG. 2, the laminated iron core piece 210 is configured in a rectangular-parallelepiped manner, by, as illustrated in FIG. 2, laminating a predetermined number of magnetic thin plates each formed of a magnetic material and each having a predetermined length. Each of the magnetic thin plates is provided with a predetermined number of teeth 211 formed at one side portion thereof, spaced apart from one another by a predetermined distance; when these magnetic thin plates are laminated so as to configure the laminated iron core piece 210, the teeth 211 form a predetermined number of slots 212. A great number of magnetic thin plates laminated in a rectangular-parallelepiped manner are welded one another, so that a plurality of adhered welding portions 213, 214, and 215 are provided.

Figure 3:
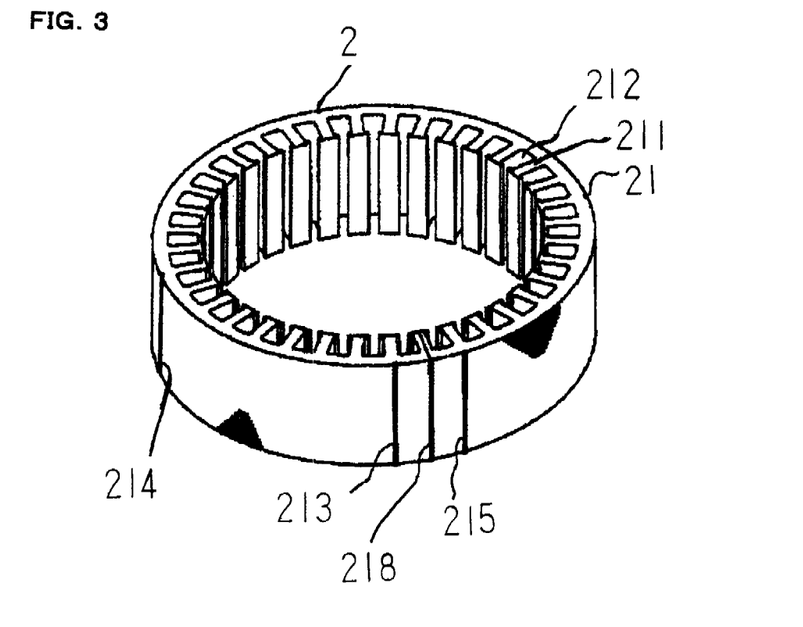
FIG. 3 is a perspective view of a laminated iron core of a stator according to Embodiment 1 of the present invention.

FIG. 3 illustrates the laminated iron core 21, of the stator 2, formed in a ring-shaped manner. The laminated iron core 21 is formed as follows. The laminated iron core piece 210 illustrated in FIG. 2 is bent to be ring-shaped in such a way that the teeth 211 and the slots 212 are oriented to the center of the ring; then, both end portions 216 and 217 of the laminated iron core piece 210 are made to abut on each other and the abutting portions are welded to become a bonding portion 218.

Figure 4:
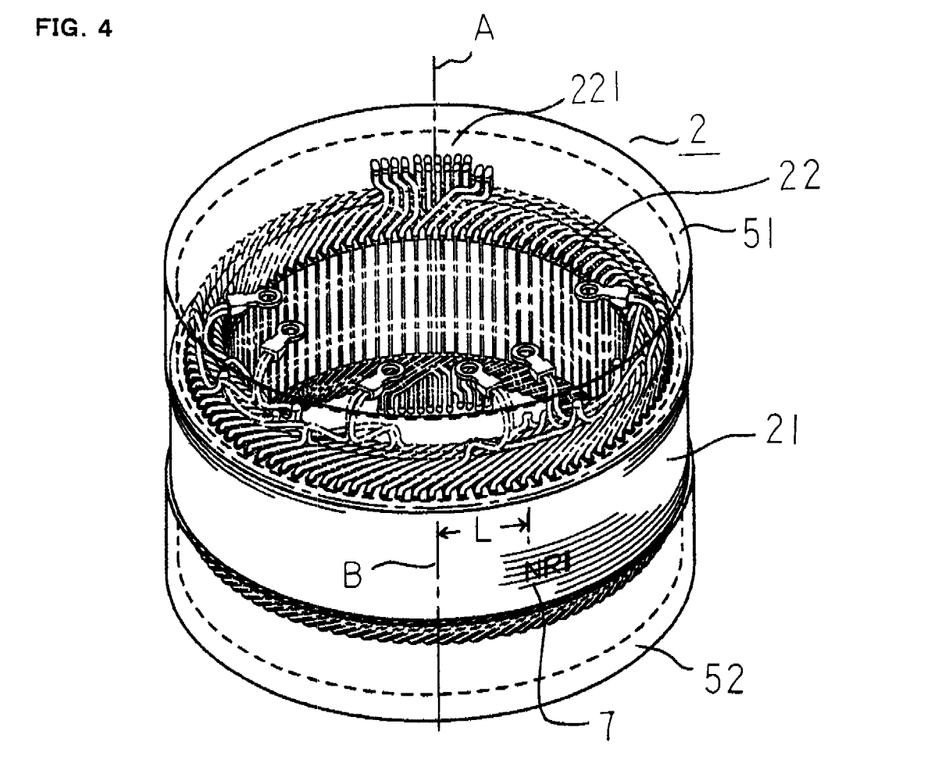
FIG. 4 is a perspective view symbolically illustrating a stator, according to Embodiment 1 of the present invention, in a state in which a resin coating has not been formed on the outer circumferential surface of the stator.

FIG. 4 symbolically illustrates the stator 2 in a state in which the stator winding 22 is mounted in the slots 212 of the laminated iron core 21. The stator winding 22 is mounted in the slots 212 of the rectangular-parallelepiped laminated iron core piece 210 illustrated in FIG. 2, and then bent in a ring-shaped manner together with the laminated iron core piece 210. As explained with reference to FIG. 3, the laminated iron core piece 210 is bent in a ring-shaped manner, and both end portions 216 and 217 are adhered to each other at the bonding portion 218, so that the laminated iron core 21 is configured.

The stator winding 22 is mounted on the unbent rectangular-parallelepiped laminated iron core piece 210 and then bent together with the laminated iron core piece 210; therefore, a coil end portion 221 of the stator winding 22 is arranged definitely in the vicinity of the bonding portion 218 of the laminated iron core 21. The respective end portions of the laminated iron core 21 formed in a ring-shaped manner are inserted into the corresponding inner circumferential portions of the end frames 51 and 52 in a pair and, as illustrated in FIG. 1, tightened by the bolt 6 through the end frames 51 and 52.

In FIG. 4, the dashed-dotted line A indicates the position of the bonding portion 218 of the laminated iron core 21; the dashed-dotted line B indicates the point-symmetric position of the position A of the bonding portion 218 of the laminated iron core 21. In other words, the position A of the bonding portion 218 and the position B are spaced apart by 180° from each other with respect to the center axis of the stator 2. A marking 7 for indicating inherent information about the stator 2 is provided at a predetermined position on the outer circumferential surface, of the laminated iron core 21, which is situated between the end frames 51 and 52 in a pair and exposed outward.

The inherent information about a stator is information, such as in which place of which factory the stator has been manufactured, which is utilized for a product analysis in the case where, after being utilized as a product, the stator is obtained by the manufacturer; thus, no information is conveyed to a third person. The marking 7, which indicates the inherent information about the stator; at a predetermined position on the outer circumferential surface of the laminated iron core, i.e., on the laminated-side surface of the magnetic thin plates, the marking 7 is formed of recesses inscribed by melting the magnetic thin plate by means of a laser beam. Because being formed of recesses on the outer circumferential surface of the laminated iron core 21, the marking 7 is not removed through friction or the like.

The marking 7 is formed at a position that is a predetermined distance L away from the point-symmetric position B of the position A of the bonding portion 218 of the laminated iron core 21. The distance L is selected in such a way that, after the stator is integrated in an electric rotating machine, the marking is situated at a position that can be viewed from outside. In addition, as described above, the coil end portion 221 of the stator winding 22 is arranged definitely in the vicinity of the bonding portion 218 of the laminated iron core 21; the approximately middle portion of the coil end portion 221 corresponds to the position A of the bonding portion 218 of the laminated iron core 21. Accordingly, the position B on the outer circumferential surface of the laminated iron core 21 is also the point-symmetric position of the approximately middle portion of the coil end portion 221.

Additionally, the indication by the marking 7 may include, for example, inherent information about the whole electric rotating machine besides the inherent information about the stator. Additionally, the marking 7 may be provided by melting the outer circumferential surface of the laminated iron core 21 so as to form recesses, by means of an electric pen or the like, instead of a laser beam.

Figure 5:
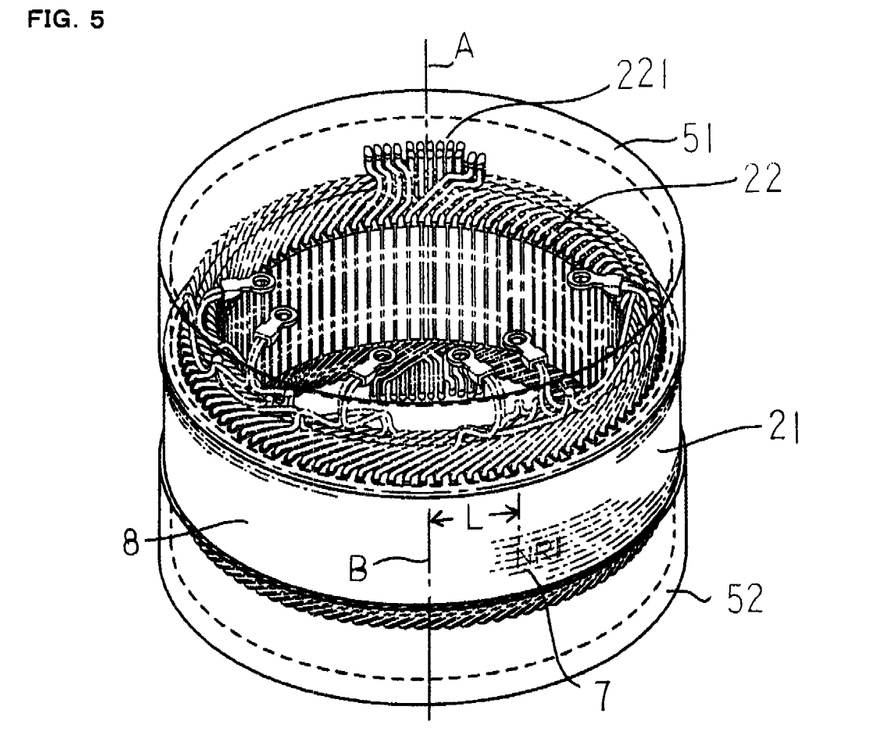
FIG. 5 is a perspective view symbolically illustrating a stator of an electric rotating machine, according to Embodiment 1 of the present invention, in a state in which a resin coating has been formed on the outer circumferential surface of the stator.

The outer circumferential surface of the laminated magnetic thin plates may be utilized, as it is, as the outer circumferential surface of the laminated iron core 21; however, in this case, because being configured with the collective machining surfaces at which the magnetic thin plates are stamped out and being exposed outward, the outer circumferential surface of the laminated magnetic thin plates is liable to change in quality, for example, to rust. Accordingly, in order to prevent the outer circumferential surface of the laminated iron core 21 from changing in quality, a resin having a rust-proof effect is coated on the outer circumferential surface of the laminated iron core 21 so that a resin coating 8 is formed. The resin coating 8 is formed after, as illustrated in FIG. 4, the marking 7 is provided on the outer circumferential surface of the laminated iron core 21. As a result, the marking 7 is covered with the resin coating 8, as illustrated in FIG. 5; however, because the resin coating 8 is transparent or semi-transparent, the marking 7 can be viewed from outside and is readily read.

Figure 6:
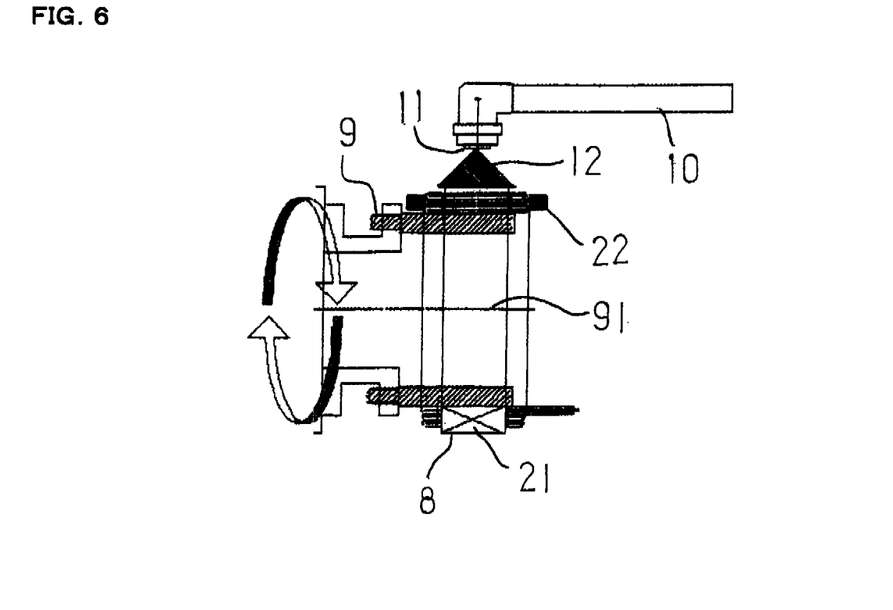
FIG. 6 is an explanatory view for explaining a coating process in which a resin coating is formed on the outer circumferential surface of a laminated magnetic core of a stator according to the present invention.

FIG. 6 illustrates an example of a working process of coating a resin on the outer circumferential surface of the laminated iron core 21. As illustrated in FIG. 6, by engaging the inner circumferential portion of the laminated iron core 21 with the outer circumferential portion of a cylindrical supporting member 9, the laminated iron core 21 and the stator winding 22 are fixed to the supporting member 9; while the supporting member 9 is rotated on a center axis 91 thereof, a liquid resin 12 is homogeneously blown off, from a nozzle 11 provided at the front end of a pipe 10, against the outer circumferential surface of the laminated iron core 21, so that the resin coating 8 is formed. As a result, change in quality of the laminated iron core due to rust or the like and adhesion of impurities to the laminated iron core, which are caused in a case where the marking 7 is inscribes in the outer circumferential surface of the laminated iron core 21, are avoided. Moreover, the resin coating 8 can prevent change in quality due to rust or the like or deterioration with time from occurring on the outer circumferential surface of the laminated iron core 21.

With the stator, of an electric rotating machine, according to Embodiment 1, it is possible to read inherent information in a state in which the electric rotating machine has been assembled; therefore, when the inherent information is read, no labor for disassembling the electric rotating machine is required, whereby working efficiency can be raised.

Embodiment 2

Figure 7:
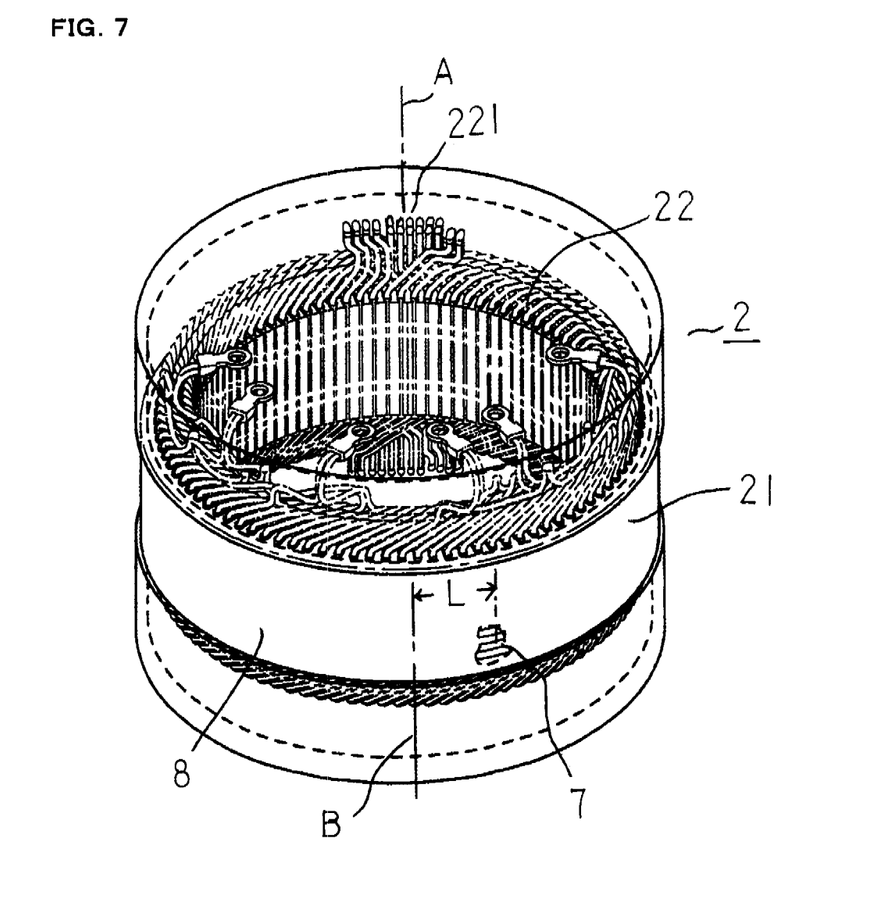
FIG. 7 is a perspective view symbolically illustrating a stator of an electric rotating machine, according to Embodiment 2 of the present invention, in a state in which a resin coating has been formed on the outer circumferential surface of the stator.

FIG. 7 is a perspective view symbolically illustrating a stator, of an electric rotating machine, according to Embodiment 2 of the present invention. In Embodiment 2, by coating an opaque resin on the outer circumferential surface of the laminated iron core 21, the resin coating 8 is formed. The other configurations of the electric rotating machine and the stator 2, the configuration of and the formation method for the marking 7, and the formation method for the resin coating 8 are the same as those in Embodiment 1.

In addition, in FIG. 7, for convenience of explanation, a state is illustrated in which part of the resin coating 8 is peeled off so that part of the marking 7 provided on the outer circumferential surface of the laminated iron core 21 is exposed; however, because being usually covered with the resin coating 8, the marking 7 is not viewed from outside.

In the case where, after the electric rotating machine has been assembled as a product, the marking 7 is referred to, the marking 7 may be exposed by peeling off or wiping off part of the opaque resin coating 8 with which the outer circumferential surface of the laminated iron core 21 is covered. In this case, as explained in Embodiment 1, the marking 7 is provided at a position that is the predetermined distance L away from the point-symmetry position B of the position A of the bonding portion of the laminated iron core 21; therefore, by, as an origin point, utilizing the point-symmetry position B of the position A of the bonding portion, the position of the marking can readily be determined. Accordingly, only the portion, of the resin coating 8, which corresponds to the marking 7 can be determined and removed, whereby there exists no possibility that the other portion of the resin coating is wiped off.

Additionally, as explained in Embodiment 1, the coil end portion 221 exists definitely at the position of the bonding portion 218 (refer to FIG. 3) of the laminated iron core 21, and the approximately middle position of the coil end portion 221 corresponds to the bonding portion 218 of the laminated iron core 21. Therefore, the position of the marking 7 may be determined by checking the approximately middle portion of the coil end portion 221 and, as an origin point, utilizing the point-symmetry position B of the approximately middle portion.

In the stator, of an electric rotating machine, according to Embodiment 2, because the resin coating 8 is rendered opaque, the indication by the marking 7 cannot be recognized as long as the resin coating 8 is not peeled off. Accordingly, even information that should not be conveyed to a third person can be indicated by means of the marking 7; by ascertaining whether or not the indication exists, it is made possible to determine whether or not the electric rotating machine or the stator is manufactured in-house, i.e., whether or not the electric rotating machine or the stator is an illegal fake product, and eventually, manufacture and sale of illegal fake products can be prevented.

Variant Example of Laminated Iron Core

Figure 8:
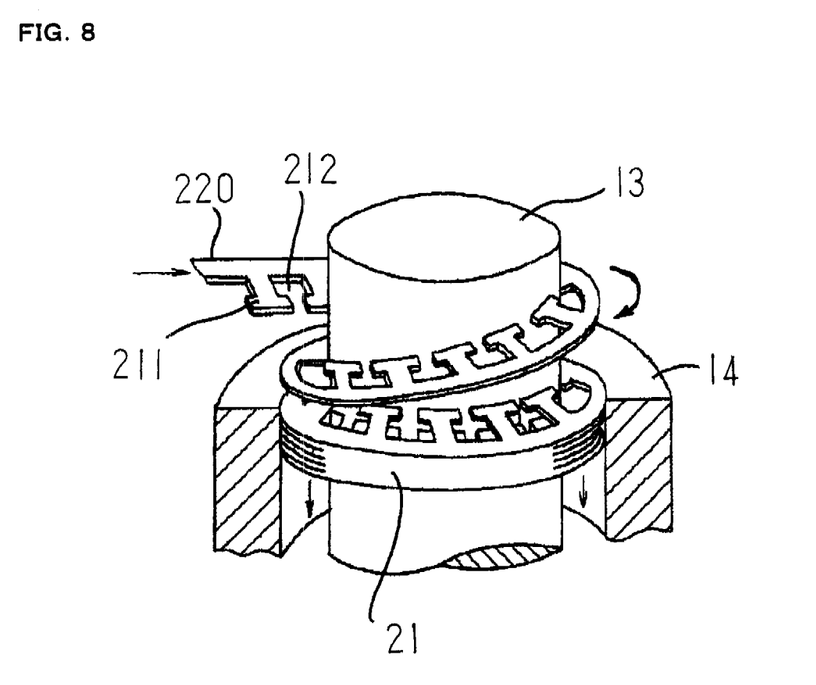
FIG. 8 is an explanatory view illustrating another manufacturing process for a laminated iron core of a stator, of an electric rotating machine, according to the present invention.

FIG. 8 is an explanatory view for explaining another manufacturing process for a laminated iron core 21 of a stator, of an electric rotating machine, according to the present invention. In this example, the laminated iron core 21 is formed by continuously winding an elongated magnetic thin plate 200, having a great number of teeth 211 that are formed at one side portion and spaced a predetermined distance apart from one another, into a space across which a jig 13 and a jig 14 face each other.

In the case of the laminated iron core formed as described above, by, as a mark, regarding the position of the coil end portion of a stator winding (unillustrated) mounted in slots 212 and providing a marking at a position that is a predetermined distance away from the point-symmetry position of the position of the coil end portion, the position of the marking can readily be determined even after the laminated iron core 21 is integrated in an electric rotating machine. In addition, the other configurations of the electric rotating machine and the stator thereof are the same as those in Embodiments 1 and 2. Additionally, the resin coating may be transparent as in Embodiment 1 or opaque as in Embodiment 2.

Figure 9:
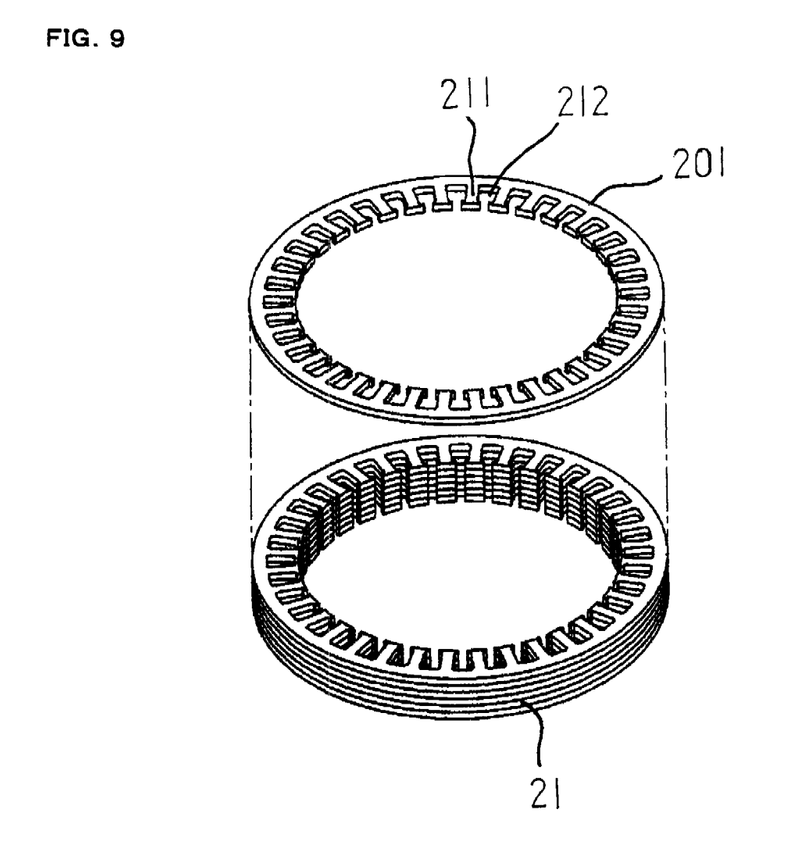
FIG. 9 is an explanatory view illustrating another manufacturing process for a laminated iron core of a stator, of an electric rotating machine, according to the present invention.

FIG. 9 is an explanatory view for explaining another manufacturing method for a laminated iron core 21 of a stator, of an electric rotating machine, according to the present invention. In this example, a laminated iron core 21 is formed by laminating a predetermined number of ring-shaped magnetic thin plates 201 each provided, at the inner side thereof, with a predetermined number of teeth 211 and a predetermined number of slots 212 formed of the teeth 211.

In the case of the laminated iron core formed as described above, as is the case with the laminated iron core illustrated in FIG. 8, by, as a mark, regarding the position of the coil end portion of a stator winding (unillustrated) mounted in the slots 212 and providing a marking at a position that is a predetermined distance away from the point-symmetry position of the position of the coil end portion, the position of the marking can readily be determined even after the laminated iron core 21 is integrated in an electric rotating machine. In addition, the other configurations of the electric rotating machine and the stator thereof are the same as those in Embodiments 1 and 2. Additionally, the resin coating may be transparent as in Embodiment 1 or opaque as in Embodiment 2.

Additionally, although not illustrated, a single laminated iron core may be configured in such a way that laminated iron core pieces formed in a rectangular-parallelepiped manner are bent into an arc-shaped laminated iron core, and a plurality of arc-shaped laminated iron cores are made to abut to one another and bonded with one another through welding. Because, in this case, the laminated iron core has a plurality of bonding portions, the position of a marking may be determined by, as a mark, utilizing any one of the positions of the bonding portions, or by, as a mark, utilizing the position of the coil end portion of a stator winding.

In addition, it goes without saying that the laminated iron core of a stator, of an electric rotating machine, according to the present invention may be a laminated iron core other than the foregoing laminated iron cores explained in Embodiments 1 and 2 and the Variant Example of Laminated Iron Core.

INDUSTRIAL APPLICATION FIELD

It goes without saying that a stator, of an electric rotating machine, according to the present invention can be applied not only to the field of an electric rotating machine such as an AC generator mounted in an vehicle but also to an electric rotating machine utilized in all other fields.

The invention claimed is:

1. A stator of an electric rotating machine, comprising:
a laminated iron core having slots, in the inner circumferential surface thereof, in which a stator winding is mounted; and
a supporting member that fixes the laminated iron core in such a way that at least part of the outer circumferential surface of the laminated iron core is exposed,
the laminated iron core is provided with a plurality of recesses formed into a curved portion of the exposed outer circumferential surface thereof, the curved portion of the exposed outer circumferential surface being exposed toward the outside even after the stator is integrated in the electric rotating machine by being fixed with the supporting member,
wherein the plurality of recesses, being exposed toward the outside even after the stator is integrated in the electric rotating machine by being fixed with the supporting member, form a pattern which is a marking that indicates inherent information, about at least the stator, that is utilized for a product analysis on the electric rotating machine after the stator is fixed with the supporting member, and
wherein the inherent information includes information indicating at least at which place in which factory the stator has been produced.

2. The stator of an electric rotating machine, according to claim 1, wherein the laminated iron core is formed by bonding, in the circumferential direction of the stator, a plurality of laminated member pieces each formed of a plurality of laminated magnetic thin plates, and the marking is provided on the outer circumferential surface of a portion, of the laminated iron core, that is other than the bonding portion.

3. The stator of an electric rotating machine, according to claim 2, wherein the laminated iron core is formed in a cylindrical manner, by laminating a plurality of belt-shaped magnetic thin plates in each of which a plurality of teeth is formed in such a way as to extend in a direction perpendicular to the longitudinal direction of the magnetic thin plate and in such a way as to be spaced a predetermined distance apart from one another and by bonding in the circumferential direction of the stator at least one of the laminated member pieces bent in the direction perpendicular to the longitudinal direction of the magnetic thin plate.

4. The stator of an electric rotating machine, according to claim 2, wherein the marking is provided at a predetermined position that is determined based on a point-symmetry position that is diametrically opposite to the bonding position of the laminated iron core.

5. The stator of an electric rotating machine, according to claim 1, wherein the marking is provided at a predetermined position, on the outer circumferential surface of the laminated iron core, that is determined based on a point-symmetry position that is diametrically opposite to a position on the outer circumferential surface of the laminated iron core that corresponds to a coil end portion of the stator winding mounted on the laminated iron core.

6. The stator of an electric rotating machine, according to claim 1, wherein the outer circumferential surface of the laminated iron core is covered with a resin coating, so that the marking is covered with the resin coating.

7. The stator of an electric rotating machine, according to claim 6, wherein the resin coating is opaque.

8. The stator of an electric rotating machine, according to claim 1, wherein the recesses that form the marking are formed by melting the outer circumferential surface of the laminated iron core by use of a laser beam.

9. The stator of an electric rotating machine, according to claim 1, wherein the marking is alphanumeric.

* * * * *